United States Patent [19]
Katzman

[11] Patent Number: 5,140,254
[45] Date of Patent: Aug. 18, 1992

[54] SHOWER ACCESSORY

[76] Inventor: David Katzman, 18250 S. Dr., No. 92, Southfield, Mich. 48076

[21] Appl. No.: 597,201

[22] Filed: Oct. 10, 1990

[51] Int. Cl.⁵ .................................................. H02P 1/00
[52] U.S. Cl. .......................................... 322/35; 320/61
[58] Field of Search ................................ 320/61; 322/35

[56] References Cited

U.S. PATENT DOCUMENTS

| 4,564,889 | 1/1986 | Bolson | 362/192 |
| 4,636,707 | 1/1987 | Law | 322/35 |
| 4,731,545 | 3/1988 | Lerner et al. | 290/54 |
| 4,880,145 | 11/1989 | McManus | 222/192 |
| 4,918,369 | 4/1990 | Solorow | 322/35 |

FOREIGN PATENT DOCUMENTS 2426861 12/1975 Fed. Rep. of Germany ........ 322/35

Primary Examiner—Steven L. Stephan
Assistant Examiner—Thomas M. Dougherty
Attorney, Agent, or Firm—Gifford, Groh, Sprinkle, Patmore and Anderson

[57] ABSTRACT

An accessory is provided for a shower having a shower outlet. The accessory includes a housing having a front, a back and a fluid passageway extending between the front and the back of the housing. The housing is attached to the water outlet so that the fluid passageway registers with the outlet and so that water flow through the outlet also flows through the fluid passageway. An electrically powered device, such as a radio, is contained within the housing. Additionally, an impeller coupled to a generator is positioned within the fluid passageway. The electrical outlet from the generator is connected to the radio so that fluid flow through the fluid passageway drives the impeller and its attached generator in order to electrically power the radio.

1 Claim, 1 Drawing Sheet

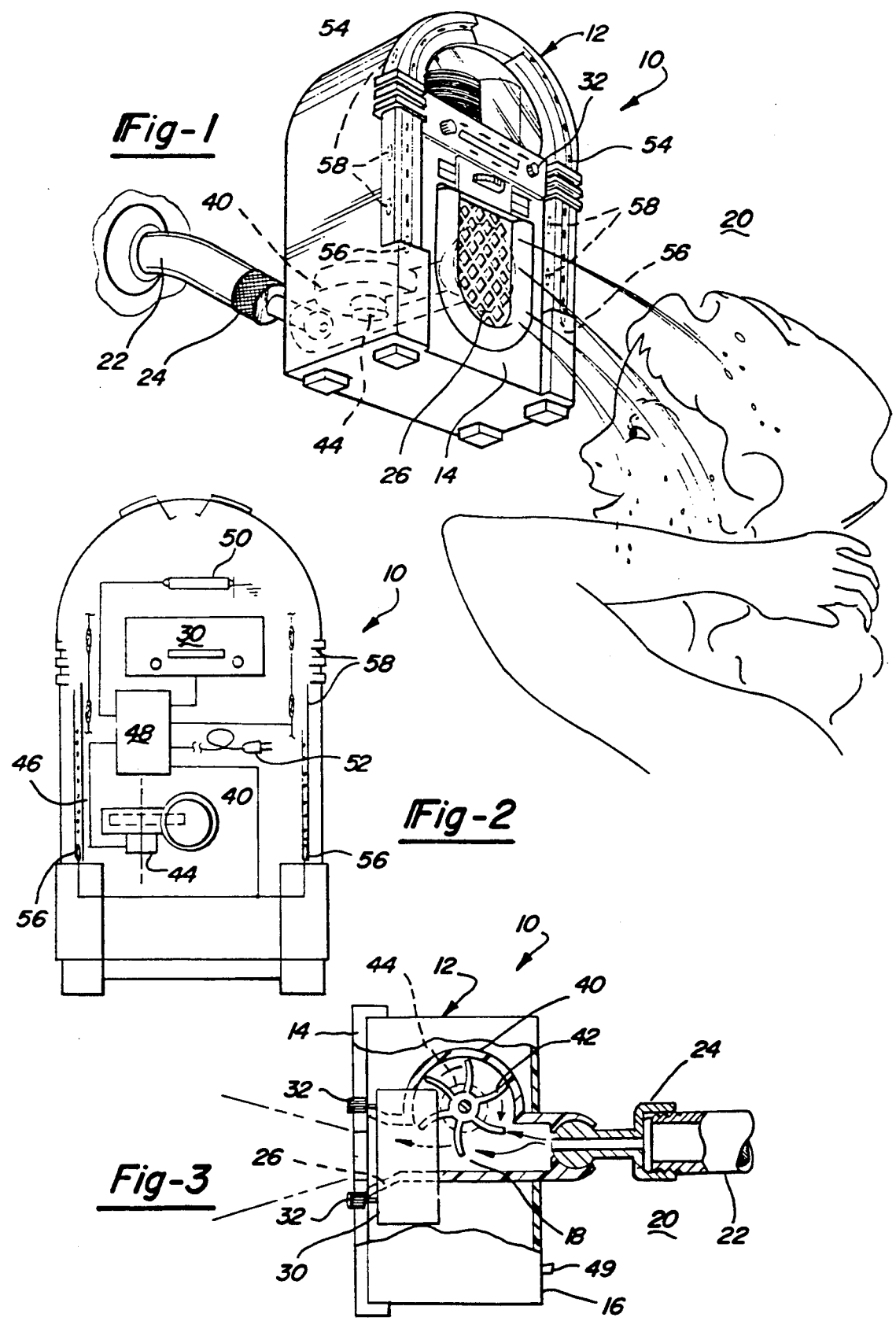

SHOWER ACCESSORY

BACKGROUND OF THE INVENTION

I. Field of the Invention

The present invention relates generally to bathroom accessories and, more particularly, to a radio for use in a shower.

II. Description of the Prior Art

There have been a number of previously known radios that are particularly designed for use in a shower. Such radios typically include a waterproof housing and are battery powered. Typically, the radio is hung from a hook mounted on the shower wall by a suction cup, adhesive or the like.

One disadvantage of these previously known radios, is that the suction cup, adhesive or the like which secures the radio to the wall becomes undone. When this happens, the radio falls to the floor or the bottom of the shower which damages the radio.

A further disadvantage of these previously known shower radios is that the battery must be replaced when it is depleted. This not only is expensive, but also inconvenient since a replacement battery is not always readily available.

SUMMARY OF THE PRESENT INVENTION

The present invention provides a shower accessory which overcomes all of the above mentioned disadvantages of the previously known devices.

In brief, the accessory of the present invention comprises a housing having a front, a back, and a fluid passageway extending between the front and the back. The housing is connected to the water outlet for the shower so that the water outlet registers with the fluid passageway through the housing. Thus, water flow through the water outlet also flows through the fluid passageway and is discharged through the front of the housing onto the person taking the shower.

An electronic device, such as a radio, clock radio or the like, is also contained within the housing. In order to electrically power the radio, an impeller having a plurality of vanes is rotatably mounted to the housing so that a portion of the vanes extends into the fluid passageway. Consequently, water flow through the fluid passageway rotatably drives the impeller.

An electrical generator, in turn, is mechanically coupled with the impeller so that rotation of the impeller rotatably drives the electrical generator thus producing an electrical power output from the generator. This electrical output is electrically connected to and electrically powers the radio.

In the preferred embodiment of the invention, the housing simulates a Wurlitzer record player reduced in size. Preferably, at least one oil filled tube is contained within the housing and has an electric heater at its bottom. Upon the application of power to the heater, the oil boils thus producing bubbles in the tube and further simulating a Wurlitzer player. Different colored lights are also contained within the housing in order to further simulate a Wurlitzer player.

Although hydroelectric power is preferably used to electrically power the radio, the housing may also include a battery as well as an electric cord so that alternative power sources can also be employed.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is an elevational view illustrating a preferred embodiment of the present invention;

FIG. 2 is a diagrammatic view illustrating the preferred embodiment of the present invention; and FIG. 3 is a side sectional view illustrating the preferred embodiment of the present invention.

DETAILED DESCRIPTION OF A PREFERRED EMBODIMENT OF THE PRESENT INVENTION

With reference first to FIGS. 1 and 3, a preferred embodiment of the shower accessory 10 of the present invention is thereshown and comprises a housing 12 having a front 14 and a back 16. A fluid passageway 18 (FIG. 3) extends between the front 14 and back 16 of the housing 12 for a reason to be subsequently described.

The accessory 10 is adapted for use in a shower 20 having a shower outlet 22. In the well known fashion, when the water to the shower is turned on, water flows out through the shower outlet 22 and into the shower stall or tub.

As best shown in FIG. 3, a fluid coupling 24 is provided at the back 16 of the housing 12. This fluid coupling 24 fluidly connects the housing 12 to the water outlet 22 so that, in doing so, the fluid passageway 18 in the housing 12 registers with and fluidly communicates with the water outlet 22. Thus, any water flow through the water outlet 22 also flows through the passageway 18 and out through a grill shaped shower head 26 at the front of the housing 14.

With reference now to FIGS. 2 and 3, an electrically powered device 30, such as a radio, is contained within the housing 12 so that the controls 32 for the electrically powered device 30 are accessible from the front 14 of the housing 12. Although the electrically powered device 30 is preferably a radio, it can alternatively be a clock radio, music generator or the like.

As best shown in FIG. 3, in order to electrically power the device 30, an impeller 40 having a plurality of vanes 42 is rotatably mounted to the housing 12 so that a portion of the vanes 42 extends into the fluid passageway 18. Consequently, water flow through the shower outlet 22, and thus through the passageway 18, rotatably drives the impeller 40 about its axis.

A generator 44 is mechanically coupled with the impeller 40 so that the generator 44 produces electrical power on it outlet 46 (FIG. 2) when rotatably driven by the impeller 40. This electrical power from the generator 44 is electrically coupled through an electrical distribution circuit 48 to the electrically powered device 30.

Although hydroelectric power as has been previously described is preferably employed to power the device 30, alternatively a battery 50 or electrical power cord 52 are also electrically coupled through the electrical distribution circuit 48 to the device 30. The circuit 48 also includes a ground fault interrupt having a reset button 49 (FIG. 3) to protect the user from accidental shock.

As best shown in FIG. 1, the accessory 10 of the present invention preferably simulates the appearance of a Wurlitzer player. In order to further enhance the simulation of the Wurlitzer player, at least one and preferably two oil filled tubes 54 are provided around both sides of the front 14 of the housing 12. An electrical heater 56 at the bottom of each tube produces bubbles in the tube when the heaters 56 are electrically powered. Colored LED lights 58 next to the tubes 54 also further enhance the simulation of a Wurlitzer player.

From the foregoing, it can be seen that the present invention provides a novel hydroelectrically powered shower accessory which is attractive in appearance and fun to use. Having described my invention, however, many modifications thereto will become apparent to those skilled in the art to which it pertains without deviation from the spirit of the invention as defined by the scope of the appended claims.

I claim:
1. An accessory for a shower having a shower water outlet, said accessory comprising:
 a housing having a front, a back and a fluid passageway extending between said front and said back,
 means for attaching said housing to said output so that said passageway fluidly communicates with said water outlet,
 an electrically powered device contained within said housing,
 means driven by fluid flow through said passageway and for generating electricity in response thereto,
 means responsive to said generating means for electrically powering said device,
 at least one oil filled tube mounted to said housing and an electric heater at a lower end of said tube,
 means for electrically powering said electric heater.

* * * * *